United States Patent
Rasel et al.

(10) Patent No.: US 11,787,374 B2
(45) Date of Patent: Oct. 17, 2023

(54) METHOD FOR IMPROVING THE ADHESION OF A RAIL VEHICLE BY CONDITIONING SELECTED AXLE(S)

(71) Applicant: KNORR-BREMSE SYSTEME FÜR SCHIENENFAHRZEUGE GMBH, Munich (DE)

(72) Inventors: Thomas Rasel, Höhenkirchen-Siegertsbrunn (DE); Ulf Friesen, Neubiberg (DE); Marc-Oliver Herden, Munich (DE); Jörg-Johannes Wach, Munich (DE); Reinhold Mayer, Karlsfeld (DE)

(73) Assignee: KNORR-BREMSE SYSTEME FÜR SCHIENENFAHRZEUGE GMBH

(*) Notice: Subject to any disclaimer, the term of this patent is extended or adjusted under 35 U.S.C. 154(b) by 806 days.

(21) Appl. No.: 16/472,009

(22) PCT Filed: Dec. 12, 2017

(86) PCT No.: PCT/EP2017/082385
§ 371 (c)(1),
(2) Date: Jun. 20, 2019

(87) PCT Pub. No.: WO2018/114473
PCT Pub. Date: Jun. 28, 2018

(65) Prior Publication Data
US 2020/0086836 A1 Mar. 19, 2020

(30) Foreign Application Priority Data
Dec. 21, 2016 (DE) .................... 10 2016 125 194.1

(51) Int. Cl.
*B60T 8/17* (2006.01)
*B60T 17/22* (2006.01)
(Continued)

(52) U.S. Cl.
CPC .......... *B60T 8/1705* (2013.01); *B60T 17/228* (2013.01); *B60L 2200/26* (2013.01); *B60T 8/172* (2013.01); *B60T 13/665* (2013.01); *B60T 2210/12* (2013.01)

(58) Field of Classification Search
CPC ...... B60T 8/1705; B60T 17/228; B60T 8/172; B60T 13/665; B60T 2210/12; B60L 2200/26
See application file for complete search history.

(56) References Cited

U.S. PATENT DOCUMENTS

2005/0189887 A1\* 9/2005 Donnelly ................ B61C 15/14
318/52

FOREIGN PATENT DOCUMENTS

DE 10 2006 057813 A1 6/2008
DE 102011113073 A1 3/2013
(Continued)

OTHER PUBLICATIONS

International Search Report corresponding to PCT/EP2017/082385 dated Mar. 19, 2018.

*Primary Examiner* — Geepy Pe
*Assistant Examiner* — Paulo Roberto Gonzalez Leite
(74) *Attorney, Agent, or Firm* — Barnes & Thornburg LLP

(57) ABSTRACT

A method for improving the adhesion of a rail vehicle by conditioning selected axle(s), detects whether a higher total brake force can be achieved by changing the manipulated variable of the wheel slip at at least one unit from a current starting wheel slip to a forced wheel slip, and, if so, changes the wheel slip at at least one unit from the current starting wheel slip to the forced wheel slip by regulating the manipulated variable of the brake application force at the unit, whereby the friction ratios between the wheel and the rail changes at the subsequent units, and regulates the manipu- (Continued)

lated variable of the brake application force at the subsequent units to regulate the wheel slip, which is likewise changed by the changed friction ratios, at the units back to the unchanged manipulated variable of the starting wheel slip, optimized brake forces being produced at the units.

9 Claims, 2 Drawing Sheets

(51) Int. Cl.
*B60T 8/172* (2006.01)
*B60T 13/66* (2006.01)

(56) References Cited

FOREIGN PATENT DOCUMENTS

| | | |
|---|---|---|
| DE | 10 2014 102881 A1 | 9/2015 |
| DE | 10 2014 204814 A1 | 9/2015 |
| RU | 2124445 C1 | 1/1999 |
| WO | 2013 034691 A2 | 3/2013 |

\* cited by examiner

METHOD FOR IMPROVING THE ADHESION OF A RAIL VEHICLE BY CONDITIONING SELECTED AXLE(S)

CROSS REFERENCE AND PRIORITY

This patent application is a U.S. National Phase of International Patent Application No. PCT/EP2017/082385 filed Dec. 12, 2017, which claims priority to Germen Patent Application No. German 10 2016 125 194.1 filed Dec. 21, 2016, the disclosures of which are incorporated herein by reference in their entirety.

FIELD

Disclosed embodiments relate to adhesion of a rail vehicle by conditioning of selected axles.

BACKGROUND

In order to accelerate or brake a rail vehicle, acceleration (tractive) or brake forces have to be transmitted at the contact point between the wheel and the rail. The maximum force which can be transmitted at the contact point between the wheel and the rail is dependent substantially on the friction characteristics between the wheel and the rail. Greater forces can be transmitted on a dry rail than on a wet or greasy rail.

If a greater brake force is requested during braking of a rail vehicle than can be transmitted on account of the friction characteristics between the wheel and the rail, at least one of the wheels can lock and can slip over the rail. This state is called sliding.

If, in contrast to this, a greater acceleration (tractive force) is requested during acceleration of a rail vehicle than can be transmitted on account of the friction characteristics between the wheel and the rail, at least one of the wheels can skid. This state is called spinning. In other words, spinning describes a state, in the case of which the wheel circumferential speed is greater than the driving speed.

In an analogous manner to this, sliding describes a state, in the case of which the wheel circumferential speed is lower than the driving speed. If the wheel circumferential speed and the driving speed are identical, this state is called rolling.

SUMMARY

Disclosed embodiments provide a method for improving the adhesion of a rail vehicle by way of conditioning of a selected axle/selected axles, an apparatus and a use for this, in order to brake a rail vehicle with a requested retardation.

BRIEF DESCRIPTION OF THE FIGURES

In the text which follows, the description of the invention will be given using exemplary embodiments and with reference to the appended drawings, in which, in particular.

Various non-positive connection types are illustrated by way of example in FIG. 1.

DETAILED DESCRIPTION

Generally speaking, the occurrence of a relative movement between the wheel circumference and the rail is called slip. If therefore the wheel circumferential speed and the driving speed are not identical, there is slip as a result. Slip is necessary, furthermore, in order for it to be possible for tractive or brake forces to be transmitted at all between the rail and the wheel. If there is a slip of zero at a wheel, this means that the wheel is rolling freely, that is to say no torques act on the wheel. Without slip, as a consequence, no transmission of power, that is to say no transmission of tractive or brake forces, is possible between the wheel and the rail. In the case of a very high slip, for example during sliding or spinning, no great forces can possibly be transmitted between the wheel and the rail. As a consequence, the optimum slip for transmitting maximum tractive or brake forces lies between zero (state of rolling) and a very high value, such as 100% (state of sliding or spinning).

The optimum slip is dependent on the friction characteristics or on the friction state between the wheel and the rail. Accordingly, the optimum slip in the case of a wet rail can be different than in the case of a dry rail. Different friction characteristics between the wheel and the rail are called non-positive connection types in the following text. Various non-positive connection types are illustrated by way of example in FIG. 1.

Figure 1:
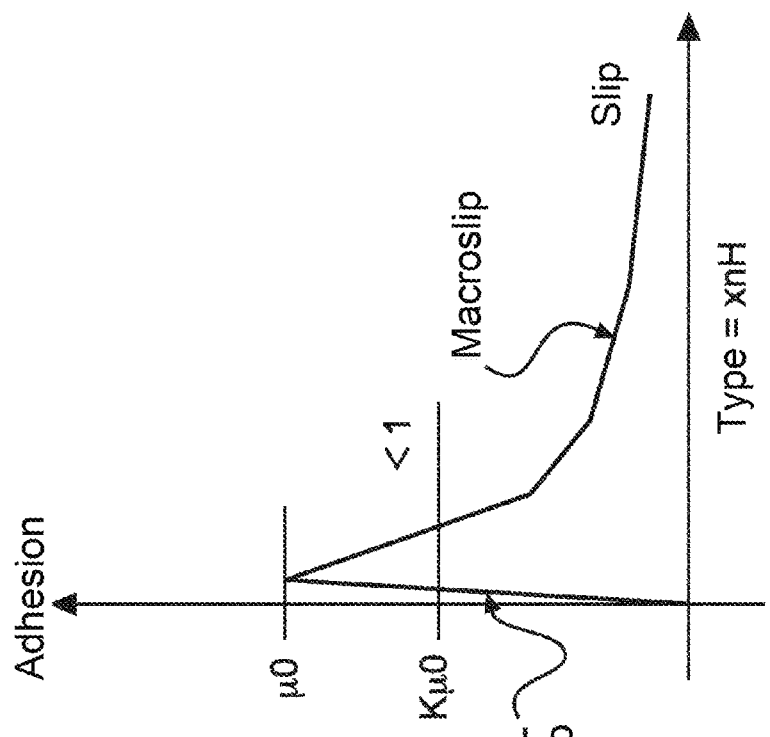
Figure 1:
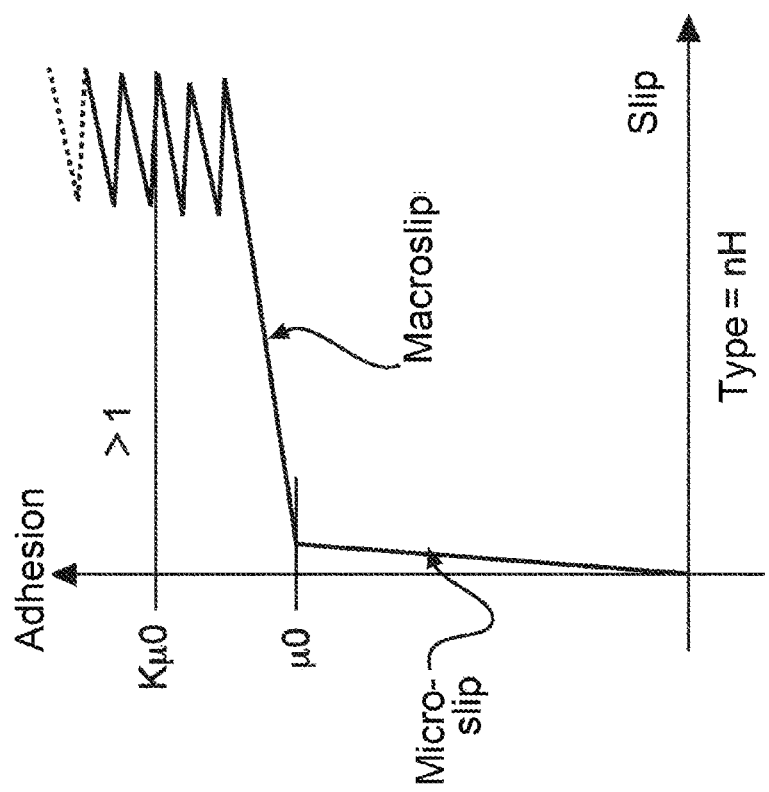

FIG. 1 shows two diagrams (non-positive connection or adhesion plotted against slip) with different non-positive connection types. The diagram on the left hand side shows a non-positive connection type which is known as nH (low adhesion value) among experts, the non-positive connection type which is shown on the right hand side being known as xnH (extremely low adhesion value). The slip is plotted in each case on the (horizontal) x-axis of the diagrams, whereas the (vertical) y-axis shows the adhesion or the maximum transmissible friction force between the wheel and the rail which is proportional to the former or its coefficient of friction. In the diagrams, furthermore, a value $\mu 0$ is illustrated which lies at the transition point from microslip to macroslip. The part of the graph on the left hand side of $\mu 0$ shows in each case the range of microslip, and the part of the graph on the right hand side of $\mu 0$ shows in each case the range of macroslip. Furthermore, $\mu 0$ is defined fundamentally by way of the maximum coefficient of friction in the range of microslip (left hand part of the graph).

In the case of the non-positive connection type nH which is shown on the left, maximum forces can be transmitted in the range of macroslip, it being possible for the maximum forces to be transmitted in the range of $\mu 0$ in the case of the non-positive connection type xnH which is shown on the right. If there is, for example, an nH non-positive connection condition (left hand diagram in FIG. 1), additional brake force can be applied starting from $\mu 0$, which additional brake force is implemented in the macroslip range, since the graph continues to rise starting from $\mu 0$. This behavior is also called "self-improvement".

If, in contrast to this, there are xnH non-positive connection conditions, the brake force can then be increased in a range between 0 and $\mu 0$ only up to a maximum proportion to be fixed of $\mu 0$, in order to prevent a transition into the macroslip range (this is because the graph drops again starting from $\mu 0$ here, and there is no "self-improvement"). This maximum proportion to be fixed of $\mu 0$ is illustrated as $K\mu 0$ in the diagrams and relates to $\mu 0$. As a consequence, the value $K\mu 0$ represents a factor which references to $\mu 0$ and indicates a percentage proportion of $\mu 0$ which can be utilized for the transmission of force, without it being necessary to fear a transition into the macroslip range in the case of a non-positive connection type xnH. A $K\mu 0>1$ results for the non-positive connection type nH (left hand diagram in FIG. 1), whereas a $K\mu 0<1$ results for the non-positive connection type xnH (right hand diagram in FIG. 1). If, for example, 80% (=0.8) of $\mu 0$ is to be capable of being used during braking in the case of a non-positive connection type xnH, in order to ensure a 20% "safety gap" from the macroslip range, a $K\mu 0$ of 0.8 results. Methods and apparatuses which regulate the brake operation of a rail vehicle by means of a wheel slide protection regulation are known in the prior art. A wheel slide protection regulation in accordance with the prior art is known from the publication "UIC Merkblatt 541-05, Bremse—Vorschriften für den Bau der verschiedenen Bremsteile—Gleitschutzanlage" [UIC data sheet 541-05, brake—specifications for the construction of the various brake parts—wheel slide protection system] of the International Union of Railways (UIC), ISBN 2-7461-0968-9.

A wheel slide protection regulation in accordance with the prior art determines a slip value from the wheel rotational speed, by which slip value maximum friction forces can be transmitted between the wheel and the rail, which maximum friction forces brake the rail vehicle. A slip value of this type can lie at 20% in the case of damp rails. In a scenario of this type, the wheel slide protection regulation would specify a slip of 20% at each of the braked wheels during emergency braking. Here, the slip of 20% corresponds to the actuating variable, according to which the brake application forces of the brakes are regulated, in order to maintain the predefined slip value. Here, the brake application force denotes the force of the brake system on the individual wheel, that is to say, for example, the force of a brake cylinder on a wheel. If a slip of 20% is therefore specified as an actuating variable in the case of emergency braking, but there is currently only 15% slip at an axle, the brake application force (control variable) of the brake apparatus at the axle is increased, in order to brake in a more pronounced manner and, as a result, to achieve the specified slip state. As a result, the slip is increased from 15% to 20%, and the friction force (overall brake force or total brake force) which is transmitted between the rail and the braked wheels is increased.

Disclosed embodiments provide a method for improving the adhesion of a rail vehicle by way of conditioning of a selected axle/selected axles, an apparatus and a use for this, in order to brake a rail vehicle with a requested retardation.

The term of "units" is used in this disclosure and may include a wheel, an axle, a plurality of axles, a bogie, a wagon, or a plurality of wagons. The brake force can be regulated in each case for one unit. Furthermore, the slip can be monitored for in each case one unit.

The total brake force is decisive for the brake capability of a rail vehicle. The total brake force is formed from the sum of the brake forces (friction forces between the wheel and the rail) of all units.

In accordance with at least some embodiments, the adhesion characteristics of all units may be monitored, and it is determined whether a change of the slip at a unit leads to an improvement of the friction characteristics at the following units, as a result of which greater brake forces (friction forces between the wheel and the rail) can be transmitted at the following units, by way of which greater brake forces an increased overall brake force can be realized.

In accordance with at least some embodiments, the wheel slip (actuating variable) of a front (with regard to the driving direction of a rail vehicle) unit is increased (as an alternative to this, is reduced), by way of regulation of the brake application force at the front unit. On account of the change of the slip at the front unit, the friction characteristics at the wheel/rail contact of the following units change. On account of this, the values $\mu 0$ and, as a consequence, also $K\mu 0$ for the following units are increased. As a consequence, the brake force can be increased by way of the wheel slip protection regulation by way of raising of the brake application forces at the following units, with a constant wheel slip, or in order to hold the wheel slip at the previous value or to regulate it to the value again, which leads to an improved total brake force of the overall vehicle. As a result, in particular, an improved total brake force of the overall vehicle can be achieved, although the brake force (friction force between the wheel and the rail) at the front unit drops, as a result of the increase of the slip.

In order to illustrate the concept of the disclosed embodiments purely by way of example, the above example with a slip of 20% as control variable is used. There is a scenario, in the case of which maximum friction forces between the wheel and the rail can be transmitted at 20% slip. According to the disclosed embodiments, the wheel slip (actuating variable) would then be increased at, for example, the frontmost axle (unit) to, for example, 40%, by way of an increase of the brake application force (control variable) of the brake at the axle. As a result, the brake force worsens, that is to say the friction force between the wheel and the rail at the frontmost axle. The friction characteristics of the following axles are changed, however, in such a way that greater friction forces can then be transmitted between the wheel and the rail at the axles in the case of an unchanged slip of 20%. The brake application force (control variable) is increased at the units as a consequence, in the case of an unchanged actuating variable of 20% slip at the units.

The overall brake force (friction force between all braked wheels and the rail) of the rail vehicle is increased as a result, although the brake force at the first unit has been downgraded. This effect can be explained, for example, by the fact that moisture and dirt are discharged from the rail in an improved manner at the first unit as a result of the changed slip, as a result of which the friction characteristics of the following units are improved.

Moreover, a scenario is conceivable, in which the friction force at one of the front units rises as a result of a change of the slip, and the friction forces at the following units likewise rise.

According to at least some disclosed embodiments, the adhesion characteristics of all units are monitored, and it is determined whether the use of local measures at one unit leads to an improvement of the friction characteristics at the remaining units, as a result of which greater brake forces can be transmitted at the remaining units, by way of which greater brake forces an increased overall brake force can be realized. The local measures which are provided for raising the train-wide adhesion characteristics or for improving the train-wide friction characteristics between the wheel and the rail can in some circumstances downgrade the friction characteristics between the wheel and the rail at a single unit, and can nevertheless improve the train-wide adhesion characteristics. In accordance with disclosed embodiments, the following are provided, inter alia, as local measures: maximized slip input, sanding, sanding in combination with maximized slip input, electromagnetic rail brake, electromagnetic rail brake in combination with maximized slip input, electromagnetic rail brake in combination with sanding.

As viewed in the driving direction of the rail vehicle, units of this type which travel behind a (front) unit, at which an adhesion-improving measure (that is to say, change of the slip and/or at least one of the abovementioned local measures) is carried out, can transmit an increased brake force. In accordance with disclosed embodiments, the train-wide adhesion increase which is to be expected firstly and the local brake force loss which is possibly to be accepted for this purpose are taken into consideration and controlled in a train-wide manner during the use of the local measures.

The first unit of the rail vehicle is advantageously regulated as described above (that is to say, change of the slip and/or at least one of the abovementioned local measures), in order to make it possible to utilize the advantageous friction characteristics at the wheel/rail contact at as many following units as possible.

Figure 2:
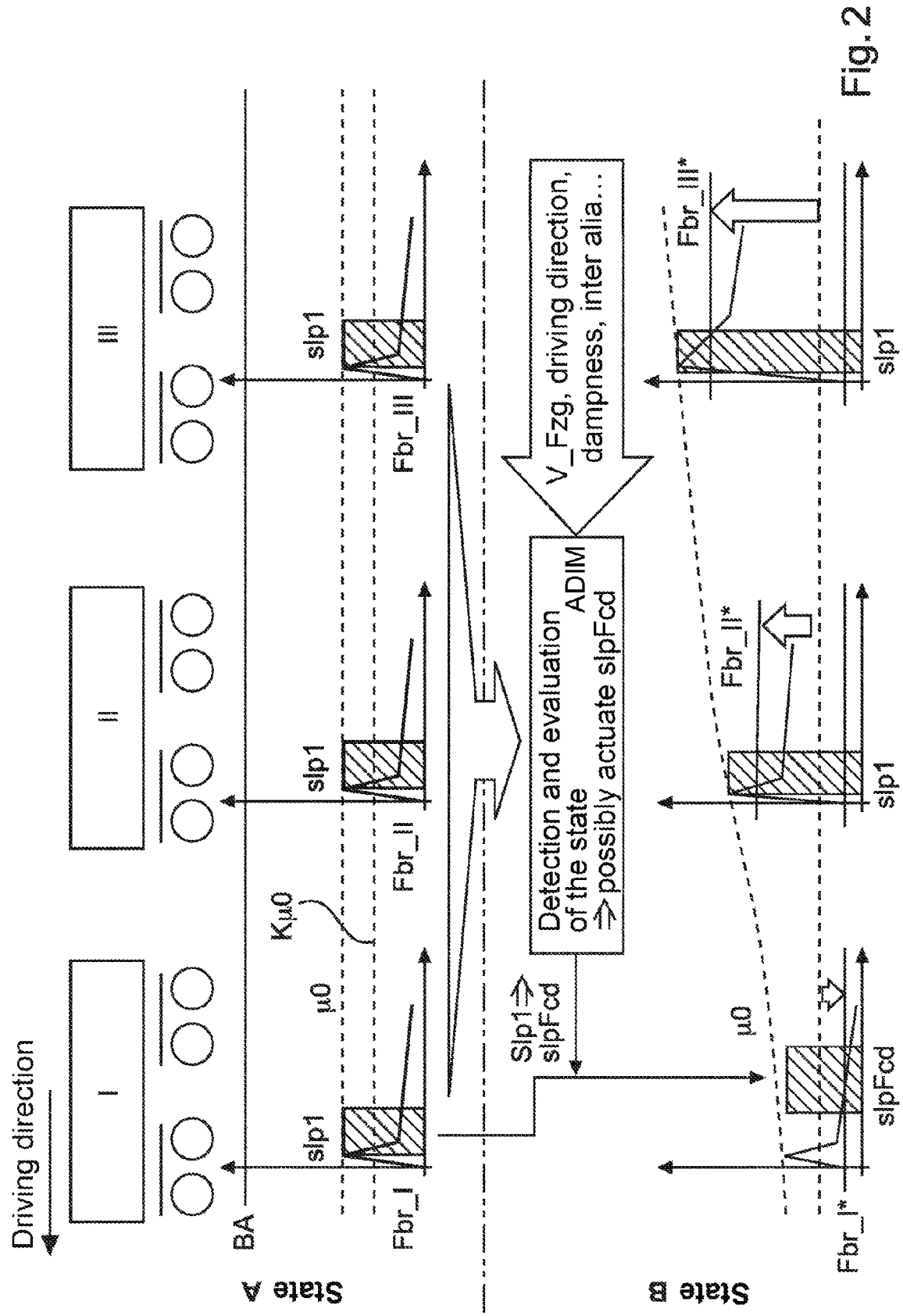
FIG. 2 shows an example of a rail vehicle provided in conjunction with the disclosed embodiments.

The upper region of FIG. 2 shows a rail vehicle with three wagons, namely a wagon on the far left, a wagon in the center, and a wagon on the far right, in a diagrammatic side view. In this exemplary embodiment, a driving direction of the rail vehicle toward the left is assumed. In this exemplary embodiment, in each case one wagon corresponds to one unit. As a consequence, the left hand wagon corresponds to a unit I, the central wagon corresponds to a unit II, and the right hand wagon corresponds to a unit III. Below the wagons or the units I, II, III, a diagram of non-positive connection plotted against slip is shown for each unit I, II, III. These are diagrams of the non-positive connection type xnH, in an analogous manner to FIG. 1. In the following text, the diagrams of the state A (range above the dash-dotted line) will be described.

A current brake force (friction force between the wheel and the rail) Fbr_I, Fbr_II, Fbr_III is shown for each of the units I, II, III in state A, which current brake force lies in each case at the value Kµ0. The friction or brake forces are achieved by virtue of the fact that a wheel slip slp1 is predefined as an actuating variable at all units I, II, III, and the brake application forces at all units I, II, III are regulated as a control variable in accordance with the actuating variable. As a consequence, the maximum available brake force Kµ0 is called up at each of the units I, II, III. As a consequence, an increase of the brake forces Fbr_I, Fbr_II, Fbr_III by way of a change of the slip at the units I, II, III is not possible at any of the units I, II, III; in this regard, see also the explanations with respect to FIG. 1.

If, when one of the methods according to the disclosed embodiments is being carried out, it is detected that a higher total brake force F_Sum_B can be achieved by way of a change of the slip actuating variable at unit I from slp1 to a forced wheel slip slpFcd, the transition to state B takes place.

In the following text, the diagrams of state B (range below the dash-dotted line) will be described.

In state B, the slip at unit I has been regulated from the previous slip slp1 to the (greater) forced wheel slip slpFcd. The brake application force (control variable) at unit I rises as a result of the regulation intervention. Here, the brake force Fbr_I* in state B is lower than the brake force Fbr_I in state A. By way of the braking of the preceding unit I in the forced macroslip range slpFcd, the rails are conditioned in such a way that the values µ0 and, as a consequence, also Kµ0 for the following units II and III rise, and therefore the slip at the units falls up to an engagement of the regulator (=state in the transition from state A to state B, not shown). The wheel slip actuating variable remains unchanged at slp1 at the units II and III, however. As a consequence, the brake application force control variable is raised by way of the regulation, in order to regulate the wheel slip at the units II and III to the actuating variable again (=state B). In state B, as a consequence, an optimized brake force Fbr_II* can be transmitted at unit II, and an optimized brake force Fbr_III* can be transmitted at unit III.

The total brake force of all units I, II, III in state A is:

$$F\_Sum\_A = Fbr\_I + Fbr\_II + Fbr\_III$$

The total brake force of all units I, II, III in state B is:

$$F\_Sum\_B = Fbr\_I^* + Fbr\_II^* + Fbr\_III^*$$

Furthermore, it is the case that:

$$F\_Sum\_B > F\_Sum\_A$$

For state A, moreover, the requested overall brake force (brake request BA) is illustrated. This lies above the total brake force F_Sum_A.

In state B, a greater proportion of the brake request BA can be implemented by way of the total brake force F_Sum_B which is then increased.

The methods according to the disclosed embodiments are denoted as ADIM in FIG. 2; this designation stands for "adhesion improver". In this exemplary embodiment, when the methods are carried out, external influence factors, such as the position and the mass of the rail vehicle, the weather, the moisture, the temperature, the speed or the driving direction of the rail vehicle, are taken into consideration. This is not a necessary prerequisite, however. The factors are not taken into consideration in a further exemplary embodiment (not shown).

LIST OF DESIGNATIONS nH Non-positive connection type "low adhesion value"
xnH Non-positive connection type "extremely low adhesion value"
µ0 Transition point from microslip to macroslip
Kµ0 Maximum available brake force
A State before application of a method according to the disclosed embodiments
B State after application of a method according to the disclosed embodiments
I, II, III Units
ADIM Adhesion Improver
Mg Electromagnetic rail brake
Fbr_I (Current/previous) brake force at unit I (in state A)
Fbr_II (Current/previous) brake force at unit II (in state A)
Fbr_III (Current/previous) brake force at unit III (in state A)
F_Sum_A (Current) total brake force of all units I, II, III in state A
Fbr_I* (Optimized) brake force at unit I (in state B)
Fbr_II* (Optimized) brake force at unit II (in state B)
Fbr_III* (Optimized) brake force at unit III (in state B)
F_Sum_B (Increased) total brake force of all units I, II, III in state B
slp1 (Current/previous) wheel slip/starting wheel slip
slpFcd Forced wheel slip

The invention claimed is:

1. A regulating method for improving the adhesion of a rail vehicle by conditioning of a selected axle/selected axles, the method comprising:
   detecting whether a higher total brake force (F_Sum_B) can be achieved by way of a change of a wheel slip actuating variable at at least one unit (I) from a current starting wheel slip (slp1) to a forced wheel slip (slpFcd) (state A); and
   in response to the detection that the higher total brake force (F_Sum_B) being achievable:
      changing the wheel slip at the at least one unit (I) from the current starting wheel slip (slp1) to the forced wheel slip (slpFcd) by regulating a brake application force control variable at the at least one unit (I), wherein, as a result of which, friction characteristics between a wheel and a rail change at following units (II, III);

regulating of the brake application force control variable at the following units (II, III), to regulate the wheel slip at the following units (II, III), which has changed as a result of the changed friction characteristics at the following units (II, III), to the current starting wheel slip (slpl) again, so that optimized brake forces (Fbr_I*, Fbr_II*, Fbr_III*), are optimized at the units (I, II, III); and the sum (F_Sum_B) of the optimized brake forces (Fbr_I*, Fbr_II*, Fbr_III*) at the units (I, II, III) after the preceding method operations(state B) being greater than the sum (F_Sum_A) of preceding brake forces (Fbr_I, Fbr_II, Fbr_III).

2. The regulating method of claim 1, wherein the forced wheel slip (slpFcd) of the at least one unit (I) is selected to be greater than the current starting wheel slip (slp1), as a result of which the brake application force control variable is increased at said unit (I), and as a result of which the optimized brake force (Fbr_I*) at the unit (I) becomes smaller than the preceding brake force (Fbr_I) of the at least one unit (I).

3. The regulating method of claim 1, wherein the forced wheel slip (slpFcd) of the at least one unit (I) is selected to be smaller than the starting wheel slip (slp1), as a result of which the brake application force control variable is reduced at said unit (I), as a result of which the optimized brake force (Fbr_I*) at the unit (I) becomes greater than the preceding brake force (Fbr_I) of the at least one unit (I).

4. The regulating method of claim 1, wherein the at least one unit (I) is not a rearmost unit (III) with regard to all the units (I, II, III) as viewed in a driving direction of the rail vehicle, but rather is one of a plurality of front units or a frontmost unit (I).

5. A regulating method for improving the adhesion of a rail vehicle by way of conditioning of a selected axle/selected axles, the method comprising:

detecting of whether a higher total brake force (F_Sum_B) can be achieved by way of a measure which improves adhesion at at least one unit (I);

in response to the detection that the higher total brake force (F_Sum_B) being achievable:

carrying out of the adhesion-improving measure at at least said unit (I);

regulating of a brake application force control variable at the following units (II, III), to regulate the wheel slip at follow units (II, III) which has changed as a result of the adhesion-improving measure to a wheel slip (slp1) which is optimized for braking, optimized brake forces (Fbr_I*, Fbr_II*, Fbr_III*) resulting at all the units (I, II, III); and the sum (F_Sum_B) of the optimized brake forces (Fbr_I*, Fbr_II*, Fbr_III*) at all the units (I, II, III) after the preceding method steps (state B) being greater than the sum (F_Sum_A) of preceding brake forces (Fbr_I, Fbr_II, Fbr_III).

6. The regulating method of claim 5, wherein the optimized brake force (Fbr_I*) at the unit (I), at which the adhesion-improving measure was carried out, is lower than the preceding brake force (Fbr_I).

7. The regulating method of claim 6, wherein the at least one unit (I) is not a rearmost unit (III) with regard to all the units (I, II, III) as viewed in the driving direction of the rail vehicle, but rather is one of a plurality of front units or a frontmost unit (I).

8. The regulating method of claim 5, wherein the adhesion-improving measure comprises:
sanding of rails,
use of an electromagnetic rail brake, or
use of an electromagnetic rail brake and sanding of the rails.

9. An apparatus for carrying out a regulating method for regulating method for improving the adhesion of a rail vehicle by conditioning of a selected axle/selected axles, the method comprising:

detecting whether a higher total brake force (F_Sum_B) can be achieved by way of a change of a wheel slip at at least one unit (I) from a current starting wheel slip (slp1) to a forced wheel slip (slpFcd) (state A); and in response to the detection that the higher total brake force (F_Sum_B) being achievable:

changing the wheel slip at the at least one unit (I) from the current starting wheel slip (slp1) to the forced wheel slip (slpFcd) by regulating the brake application force control variable at the unit (I), wherein, as a result of which, friction characteristics between a wheel and the rail change at following units (II, III);

regulating of the brake application force control variable at the following units (II, III) to regulate the wheel slip at the following units (II, III) which has changed as a result of the changed friction characteristics to the current starting wheel slip (slp1) again, so that optimized brake forces (Fbr_I*, Fbr_II*, Fbr_III*), are optimized at the units (I, II, III); and the sum (F_Sum_B) of the optimized brake forces (Fbr_I*, Fbr_II*, Fbr_III*) at the units (I, II, III) after the preceding method operations(state B) being greater than the sum (F_Sum_A) of preceding brake forces (Fbr_I, Fbr_II, Fbr_III).

* * * * *